(12) United States Patent
Konishi et al.

(10) Patent No.: US 8,441,572 B2
(45) Date of Patent: May 14, 2013

(54) IMAGING DEVICE

(75) Inventors: Akio Konishi, Hyogo (JP); Koichiro Hirabayashi, Osaka (JP); Keiji Sakamoto, Osaka (JP); Daisuke Ito, Osaka (JP); Eiji Nagasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 8 days.

(21) Appl. No.: 13/054,166

(22) PCT Filed: Jul. 9, 2009

(86) PCT No.: PCT/JP2009/003197
§ 371 (c)(1),
(2), (4) Date: Jan. 14, 2011

(87) PCT Pub. No.: WO2010/007745
PCT Pub. Date: Jan. 21, 2010

(65) Prior Publication Data
US 2011/0115975 A1   May 19, 2011

(30) Foreign Application Priority Data
Jul. 18, 2008   (JP) ................. 2008-187722

(51) Int. Cl.
H04N 5/225   (2006.01)
(52) U.S. Cl.
USPC ........... 348/374; 348/335; 257/433; 250/239; 396/55
(58) Field of Classification Search .............. None
See application file for complete search history.

(56) References Cited

U.S. PATENT DOCUMENTS

| | | | | |
|---|---|---|---|---|
| 5,668,899 A | * | 9/1997 | Jadrich ........................ 385/33 |
| 7,973,854 B2 | * | 7/2011 | Kobayashi ................... 348/373 |
| 8,063,973 B2 | * | 11/2011 | Niwamae ..................... 348/335 |
| 2004/0212720 A1 | * | 10/2004 | Kobayashi ................... 348/340 |
| 2007/0096234 A1 | * | 5/2007 | Tanaka et al. ................ 257/433 |
| 2010/0245662 A1 | * | 9/2010 | Ishikawa ...................... 348/374 |

FOREIGN PATENT DOCUMENTS

| | | |
|---|---|---|
| JP | 04-314273 A | 11/1992 |
| JP | 2004-260645 A | 9/2004 |
| JP | 2004-287304 A | 10/2004 |
| JP | 2006-311260 A | 11/2006 |
| JP | 2006-340299 A | 12/2006 |

OTHER PUBLICATIONS

International Search Report for corresponding International Application No. PCT/JP2009/003197 mailed Oct. 13, 2009.

* cited by examiner

Primary Examiner — Chieh M Fan
Assistant Examiner — Wesley J Chiu
(74) Attorney, Agent, or Firm — Renner, Otto, Boisselle & Sklar, LLP (57) ABSTRACT

To produce a subject's image on an imager as accurately as possible, a technique that is effectively applicable to the process of assembling an optical system is provided.

An imaging device includes: an imager; a plate member, to which the imager is attached; and a holding member configured to hold the plate member. The plate member has a first portion, through which at least one fixing hole has been cut, and a second portion, to which the imager is attached and through which at least one adjusting hole has been cut. The plate member is held by the holding member using a number of fastening members to be introduced through the at least one fixing hole and the at least one adjusting hole. When the first portion is fixed on the holding member, the fastening member that is introduced through the at least one adjusting hole adjusts the relative position of the second portion to the holding member.

7 Claims, 8 Drawing Sheets

LIGHT COMING FROM SUBJECT

FIG.3

LIGHT COMING FROM SUBJECT

IMAGING DEVICE

TECHNICAL FIELD

The present invention relates to an imaging device including an imager, and more particularly relates to a technique for assembling an optical system in an imaging device including an imager.

BACKGROUND ART

In a so-called "digital camera", arranged are various kinds of optical elements including lenses and an imager (such as a CCD). In order to produce a subject's image as accurately as possible on an imager, improvements have been added to not only the performance of the respective optical elements themselves but also the shapes and arrangement of members that support those optical elements.

For example, Patent Document No. 1 discloses a technique for preventing dust from heading for an imager by providing packing between the imager and an optical element that is located adjacent to the imager. Various shapes have been proposed for that packing. Patent Document No. 1 discloses packing in one shape as shown in FIG. 5 of the document and packing in a modified shape as shown in FIG. 1 of the document.

Also, after the optical system has been assembled, the camera is tested to see if the optical axis of its optical system crosses the imager at right angles. This is because unless the optical axis is perpendicular to the imager, the subject's image will be captured non-uniformly on the CCD, thus eventually getting the subject's image blurred. If the optical axis has turned out to be not perpendicular to the imager as a result of the test, then the camera is once broken up, assembled again, and then subjected to the test one more time. However, this is a very inefficient method. Thus, to avoid such an awkward situation, according to Patent Document No. 2, for example, when a CCD is fixed onto a CCD fixing member using three adjust screws, the attachment angle of the CCD is controlled by loosening or tightening each of those screws adaptively.

CITATION LIST

Patent Literature

Patent Document No. 1: Japanese Patent Application Laid-Open Publication No. 4-314273
Patent Document No. 2: Japanese Patent Application Laid-Open Publication No. 2004-287304

SUMMARY OF INVENTION

Technical Problem

Although the packing shown in FIG. 5 of Patent Document No. 1 has a simple structure, it has been pointed out that a gap could be left according to the technique disclosed in Patent Document No. 1 due to a deformation during the assembling process. On the other hand, the packing shown in FIG. 1 of Patent Document No. 1 has a complicated structure and is expensive.

Also, according to the technique disclosed in Patent Document No. 2 for controlling the attachment angle of a CCD using three adjust screws, it is not easy to see intuitively, and would require some trial and error to know, how much the attachment angle of the CCD will change by loosening or tightening each of those adjust screws. That is why according to such a technique, it is difficult to control the attachment angle of the CCD accurately.

It is therefore an object of the present invention to provide a technique that is effectively applicable to the process of assembling an optical system in order to produce a subject's image as accurately as possible on an imager. A more specific object of the present invention is to provide a member that has a simple structure and that can safely prevent dust from entering a space between optical members such as an imager. Another specific object of the present invention is to provide a simplified structure for precisely adjusting the angle defined by an imager with respect to the optical axis in two orthogonal directions independently of each other.

Solution to Problem

An imaging device according to the present invention includes: an imager; a plate member, to which the imager is attached; and a holding member configured to hold the plate member. The plate member has a first portion, through which at least one fixing hole has been cut, and a second portion, to which the imager is attached and through which at least one adjusting hole has been cut. The plate member is held by the holding member using a number of fastening members to be introduced through the at least one fixing hole and the at least one adjusting hole. When the first portion is fixed on the holding member, the fastening member that is introduced through the at least one adjusting hole adjusts the relative position of the second portion to the holding member.

The plate member and the holding member may be stacked one upon the other in a direction that is substantially parallel to a direction in which an optical axis extends, and the angle defined by the second portion with respect to the holding member may be adjusted so that the imager attached to the second portion crosses the optical axis at right angles.

The imaging device may further include at least one bridge portion that connects the first and second portions together. The at least one bridge portion may be elastically deformable. When the first portion is fixed on the holding member, the at least one bridge portion being elastically deformed may adjust a relative position of the second portion to the holding member.

The at least one bridge portion may run substantially parallel to a line that connects together the at least one fixing hole and the at least one adjusting hole.

The at least one fixing hole may be a single fixing hole. The at least one adjusting hole may include first and second adjusting holes. The at least one bridge portion may include: a first bridge portion, which runs substantially parallel to a line that connects together the fixing hole and the first adjusting hole; and a second bridge portion, which runs substantially parallel to a line that connect together the fixing hole and the second adjusting hole and which crosses the first bridge portion at substantially right angles.

The plate member may be elastically deformable. When the first portion is fixed on the holding member, the plate member being elastically deformed may adjust the relative position of the second portion to the holding member.

Each of the fastening members may be a screw. The first adjusting hole may be an elongated hole, a longer diameter of which is greater than a diameter of the screws and is parallel to the first bridge portion. The second adjusting hole may be a round hole, a diameter of which is greater than that of the screws.

The imaging device may further include at least one elastic body, which is arranged between the second portion of the plate member and the holding member. The screws that are the fastening members may bias the second portion toward the holding member and the at least one elastic body may bias the second portion away from the holding member, thereby maintaining the adjusted relative position of the second portion to the holding member.

A point of application of the at least one elastic body may be defined so that forces are applied by the screws and the at least one elastic body to substantially the same point on the second portion.

The at least one bridge portion may be warped so as to be biased away from the holding member. The screws that are the fastening members may bias the second portion toward the holding member and the at least one bridge portion warped may bias the second portion away from the holding member, thereby maintaining the adjusted relative position of the second portion to the holding member.

Advantageous Effects of Invention

The imaging device of the present invention is designed so that a plate member such as a sheet metal is held by a holding member using a number of fastening members to be introduced through a fixing hole of a first portion of the plate member and an adjusting hole of a second portion thereof. As the first and second portions are not integrated together, the first portion can be fixed using the fixing hole, and the relative position of the second portion to the holding member (e.g., the tilt of the second portion with respect to the optical axis) can be adjusted at the same time. Among other things, since the first portion is fixed on the holding member, the tilt of the second portion can be adjusted with stability.

In addition, as a resilient member is arranged so as to surround the space between multiple optical members, at least one of those optical members contacts with the resilient member on the sloped portion of the resilient member that is tilted with respect to the optical axis. Since the optical member is arranged to avoid contact with the resilient member at the top of the sloped portion, the space can be closed up securely using a simple structure, thereby preventing safely any dust from entering the device.

DESCRIPTION OF EMBODIMENTS

Hereinafter, embodiments of an imaging device according to the present invention will be described with reference to the accompanying drawings. In the following description, the imaging device is supposed to be implemented as a digital camera.

Figure 1:
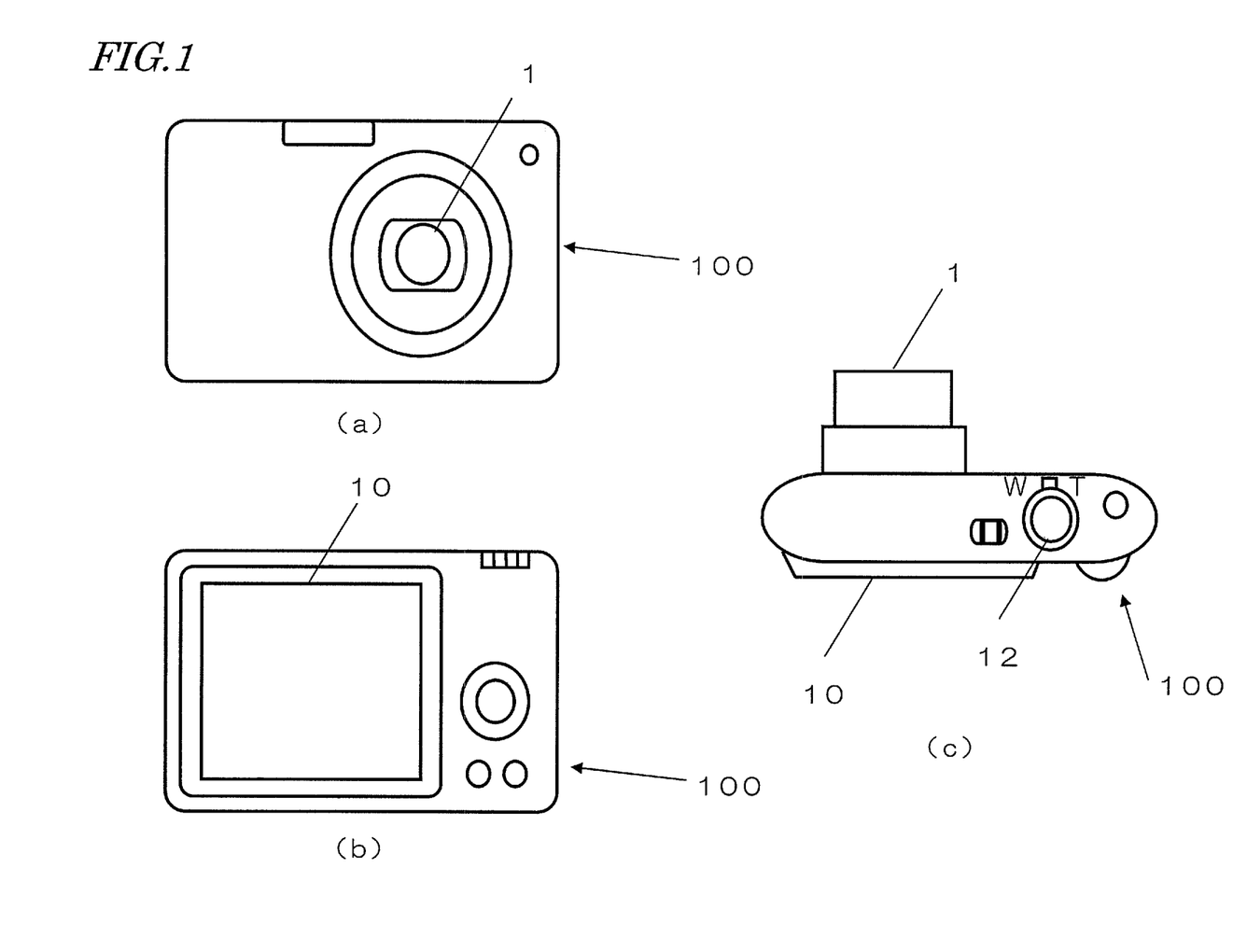
FIGS. 1(a), 1(b) and 1(c) are respectively a front view, a rear view and a top view illustrating the general appearance of a digital camera 100 as an embodiment of the present invention.

FIGS. 1(a), 1(b) and 1(c) are respectively a front view, a rear view and a top view illustrating the general appearance of a digital camera 100 as an embodiment of the present invention.

The digital camera 100 includes a barrel 1. The light that has come from the subject to shoot enters the barrel 1, goes through an optical system in the digital camera 100, and is imaged on an imager (which may be a CCD according to this embodiment) to be described later. The imager outputs an electrical signal representing the intensity of the light received. Thereafter, the electrical signal is digitized to generate video data. An image represented by the video data is presented on the LCD monitor 10 shown in FIG. 1(b). And when the shutter release button 12 shown in FIG. 1(c) is pressed down, that image data is written on a memory card (not shown).

As will be described in detail later, the CCD has its arrangement adjusted in the digital camera 100 of this embodiment so as to cross the optical axis of the optical system at right angles. Thus, as the image is captured uniformly on the CCD, it is possible to avoid an unwanted situation where only a portion of the resultant image is blurred.

Also, a cushion (of rubber in this embodiment) is arranged as a resilient member between the CCD and an optical filter, which is arranged adjacent to the CCD, thereby closing up the space between the CCD and the optical filter. The cushion can be made easily and yet can close the space between the CCD and the optical filter very easily and safely.

Next, the arrangement of the optical system in this digital camera 100 will be described. As used herein, the "optical system" includes a lens, a prism, the optical filter and the CCD. Meanwhile, various elements and parts that form the optical system will be referred to herein as "optical elements".

Figure 2:
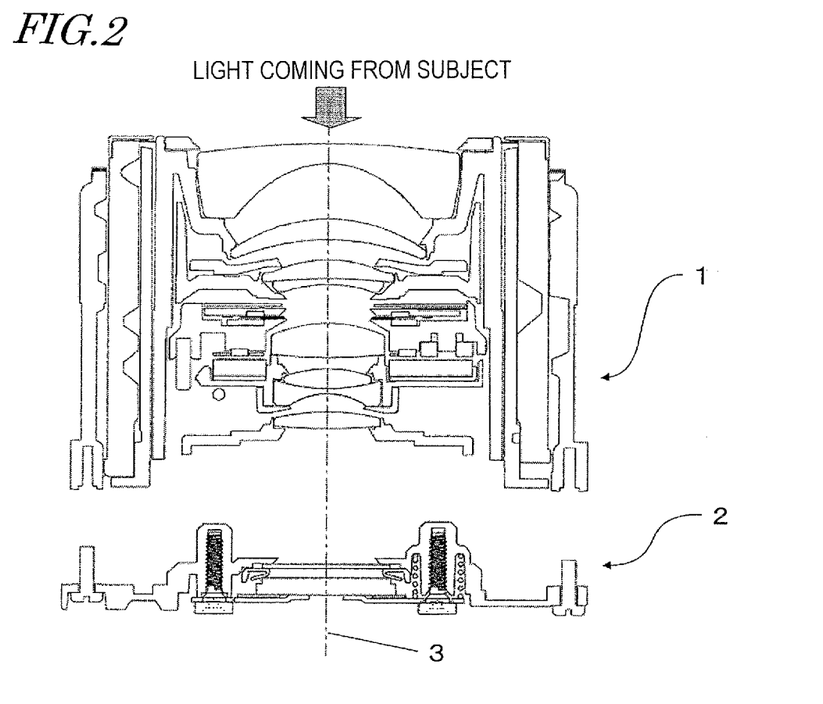
FIG. 2 is a cross-sectional view of a barrel 1 as viewed on a plane that includes an optical axis 3.

FIG. 2 is a cross-sectional view of the barrel 1 as viewed on a plane that includes the optical axis 3. The light that has come from the subject enters the barrel 1 from the top of the paper on which FIG. 2 is drawn and then travels through the barrel 1. A CCD unit 2, which is arranged deeper inside the digital camera 100 than the barrel 1 is, is also shown in FIG. 2.

Figure 3:
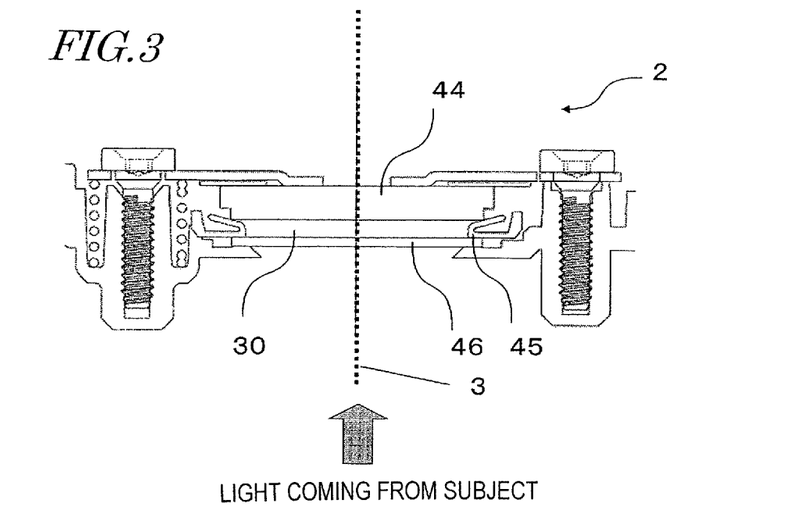
FIG. 3 is a detailed cross-sectional view of a CCD unit 2.

FIG. 3 is a detailed cross-sectional view of the CCD unit 2. The CCD 44, cushion 45 and optical filter 46 are arranged perpendicularly to the optical axis 3.

The light that has come from the subject and gone through the barrel 1 enters the CCD unit 2 along the optical axis 3 shown in FIG. 3. The incident light that has come from the subject is transmitted first through the optical filter 46, which may be an infrared cut filter or an ultraviolet cut filter, for example. After that, the light passes through the space 30 between the optical filter 46 and the CCD 44 and then reaches the CCD 44. In response, the CCD 44 outputs an electrical signal representing the light received. The electrical signal is output through a flexible printed circuit board (to be described later) that is connected to the CCD 44.

The cushion 45 and the optical filter 46 are bonded together with an adhesive. Also, the CCD 44 and the cushion 45 contact with each other with no gap left between them. More specifically, the CCD 44 is pressed against the cushion 45, thereby deforming the cushion 45 elastically. This means that the pressure applied by the CCD 44 and the restitution force of the cushion 45 are in balance at their points of contact. Furthermore, the CCD 44 is pressed against the cushion 45 at the middle of its tilted surface which is tilted with respect to the optical axis. In that state, no gap should be left between the CCD 44 and the cushion 45. Rather, the space 30 is entirely closed up by the CCD 44, the cushion 45 and the optical filter 46, and therefore, dust will never enter the space 30 from outside.

Figure 4:
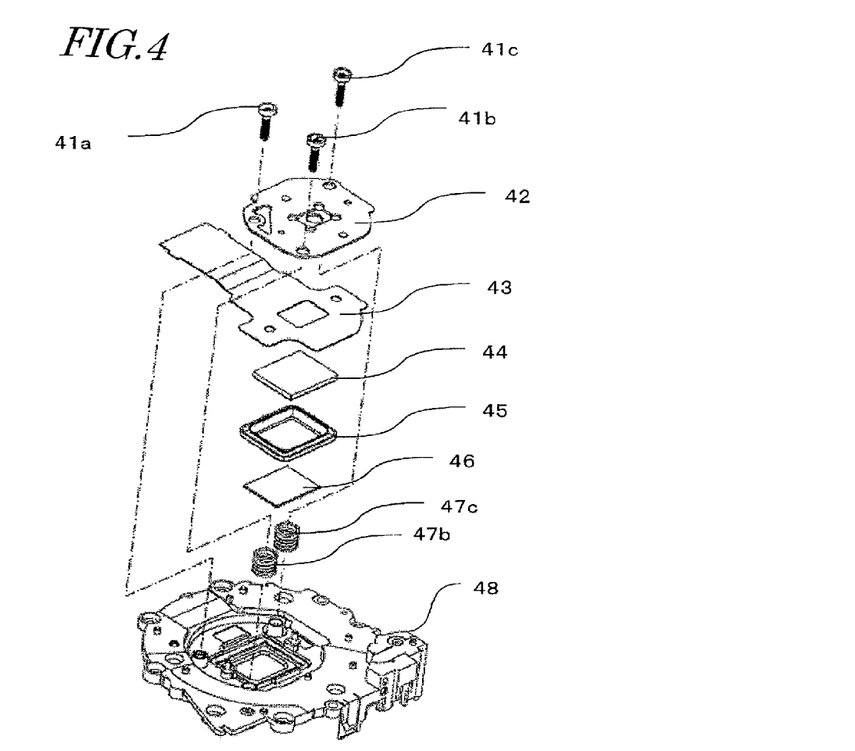
FIG. 4 illustrates how to assemble the CCD unit 2.

FIG. 4 illustrates how to assemble the CCD unit 2, which includes a sheet metal 42, a flexible printed circuit board 43, the CCD 44, the cushion 45, the optical filter 46, springs 47b and 47c, and a master flange 48. These members are assembled together in this order into the CCD unit 2. Specifically, the members identified by the reference numerals (the sheet metal) through 47b and 47c (the springs) are fixed and held onto the master flange 48 using three screws 41a to 41c. That is to say, the master flange 48 serves as a holding member for holding this lot of members.

Hereinafter, the respective members will be described one by one. But as the CCD 44, the cushion 45 and the optical filter 46 have already been described with reference to FIG. 3, the description thereof will be omitted herein to avoid redundancies.

The sheet metal 42 is a metallic plate member to which the flexible printed circuit board 43 and the CCD 44 are attached. As for the sheet metal 42, it will be described in further detail soon with reference to FIG. 5.

The flexible printed circuit board 43 is electrically connected to the CCD 44 and has wiring and circuits for transmitting an electrical signal, supplied from the CCD 44, inside this digital camera 100.

The springs 47b and 47c may be coil springs, for example, and pass the screws 41b and 41c, respectively. The springs 47b and 47c produce elastic force opposite to the direction in which the screws 41b and 41c apply their fastening force (i.e., toward the master flange 48), thereby preventing the members identified by the reference numeral 42 (i.e., the sheet metal) through 46 (i.e., the optical filter) and sandwiched between the screws 41b and 41c and the master flange 48 from getting loosened.

Hereinafter, the sheet metal 42 will be described in detail with reference to FIG. 5.

Figure 5:
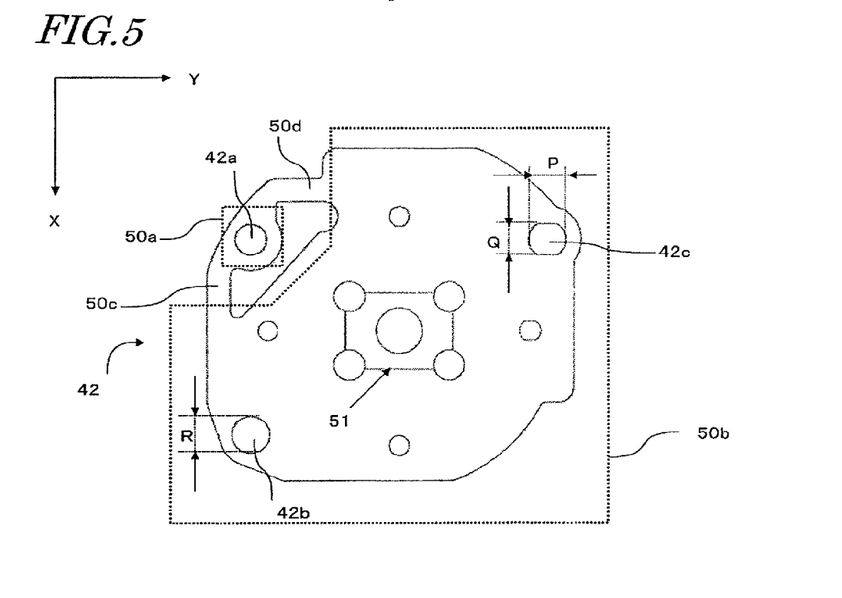
FIG. 5 is an enlarged view of a sheet metal 42.

FIG. 5 is an enlarged view of the sheet metal 42. The screws 41a through 41c shown in FIG. 4 are tightened in the direction going into the paper on which FIG. 5 is drawn.

The sheet metal 42 of this embodiment roughly consists of four portions, namely, a first portion 50a, a second portion 50b and two bridge portions 50c and 50d.

A fixing screw hole 42a has been cut through the first portion 50a to pass the screw 41a.

The second portion 50b has adjusting screw holes 42b and 42c, which have been cut to pass the screws 41b and 41c, respectively. Also, the second portion 50b has a stepped portion 51 to which the CCD 44 and the flexible printed circuit board 43 are attached.

The bridge portions 50c and 50d connect the first and second portions 50a and 50b together and have a relatively narrow width.

The sheet metal 42 to which the CCD 44 is attached has such a structure that allows the person who has assembled the CCD unit 2 to adjust the arrangement of the CCD 44 so that the CCD 44 crosses the optical axis at right angles. That is to say, one of the key elements of that structure is the bridge portions 50c and 50d. Hereinafter, it will be described in detail exactly what structure the sheet metal 42 has and how to adjust it.

It should be noted that the process step of adjusting the arrangement of the CCD 44 perpendicularly to the optical axis will also be described. That process step may be performed either while the CCD unit 2 is being assembled or after the CCD unit 2 has been assembled.

The bridge portion 50c is arranged so as to run substantially parallel to the line that connects together the fixing screw hole 42a and the adjusting screw hole 42b (i.e., the X-axis direction in FIG. 5). On the other hand, the bridge portion 50d is arranged so as to run substantially parallel to the line that connects together the fixing screw hole 42a and the adjusting screw hole 42c (i.e., the Y-axis direction in FIG. 5).

In each of the screws 41a and 41c, a stepped portion q2 is arranged under its flange (or screw head) portion q1. The fixing screw hole 42a is a round hole and has its diameter defined to be substantially equal to that of the stepped portion q2 of the screw 41a. On the other hand, the screw hole 42c is an elongated hole, and has its longer side P defined to be longer than, and its shorter side Q defined to be substantially equal to, the diameter of the stepped portion q2 of the screw 41c.

By inserting the screws 41a and 41c into the fixing screw hole 42a and the screw hole 42c, respectively, and tightening them, the sheet metal 42 can be positioned precisely with respect to the master flange 48 using the screws 41a and 41c because those round and elongated holes 42a and 42c work differently from each other.

The screw 41a is screwed tightest into the fixing screw hole 42a. After that, the screw 41b is screwed into the screw hole 42b. The diameter R of the screw hole 42b is greater than that of the screw 41b to leave some margin because the screw hole (not shown) of the master flange 48 could shift to a certain degree due to some manufacturing process error. Although the screws 41a and 41c have already been put and screwed into the screw holes 42a and 42c, respectively, the screw 41b can be inserted into the screw hole 42b securely by setting the diameter R of the screw hole 42b to be greater than that of the screw 41b. The screw hole 42b is sometimes called a "clearance hole".

It should be noted that the screws 41b and 41c are not screwed so tight into their screw holes 42b and 42c as the screw 41a is. This is done in order to adjust the angle defined by the second portion 50b with respect to the master flange 48 according to the screwing height of the screws 41b and 41c.

Although the screws 41a, 41c and 41b are supposed to be screwed into their holes in this order, this is just an example and they may be screwed in reverse order as well.

In this embodiment, the X- and Y-axis directions in FIG. 5 are parallel to their associated sides of the rectangular CCD 44.

The bridge portion 50d is elastically deformable, and has the magnitude of its deformation determined by the screwing height of the screw 41c that has been screwed through the screw hole 42c. That is to say, if the screw 41c is screwed deep, the bridge portion 50d will be deformed significantly in the direction going into the paper. On the other hand, if the screw 41c is screwed just shallowly, the degree of deformation will be small. As the bridge portion 50d is elastically deformed, the angle defined by the second portion 50b with respect to the master flange 48 in the Y-axis direction will vary proportionally to the screwing height of the screw 41c. As a result, the angle defined by the CCD 44 attached to the second portion 50b can be adjusted only in the Y-axis direction without changing its angle in the X-axis direction.

The bridge portion 50c is elastically deformable, and has the magnitude of its deformation determined by the screwing height of the screw 41b that has been screwed into the screw hole 42b. That is to say, if the screw 41b is screwed deep, the bridge portion 50c will be deformed significantly in the direction going into the paper. On the other hand, if the screw 41b is screwed just shallowly, the degree of deformation will be small. As the bridge portion 50c is elastically deformed, the angle defined by the second portion 50b with respect to the master flange 48 in the X-axis direction will vary proportionally to the screwing height of the screw 41b. As a result, the angle defined by the CCD 44 attached to the second portion 50b can be adjusted only in the X-axis direction without changing its angle in the Y-axis direction.

As described above, the bridge portions 50c and 50d are designed so as to be deformed elastically according to the screwing heights of the screws 41b and 41c. That is why the bridge portions 50c and 50d are preferably shaped so as to be elastically deformed easily possible. For example, the narrower and the longer the bridge portions 50c and 50d, the smaller the spring constant (or modulus of elasticity) of the bridge portions 50c and 50d can be. Alternatively, the spring constant of the bridge portions 50c and 50d can also be adjusted by their material.

In the embodiment described above, the second portion 50b is supposed to be not deformed elastically, no matter how tight the screws 41b and 41c are screwed. This is because if the second portion 50b, to which the CCD 44 is attached, were deformed, the angle defined by the CCD 44 with respect to the optical axis would change due to a factor other than its screwing height to be adjusted by the degree to which the screws 41b and 41c are screwed.

As described above, by adjusting the screwing height of the screws 41b and 41c, the angle defined by the second portion 50b with respect to the master flange 48 can be controlled in the direction going into the paper on which FIG. 5 is drawn.

In order to make portions of the sheet metal 42 that surround the screw holes 42b and 42c contact with the respective flange portions of the screws 41b and 41c securely when the CCD unit 2 is adjusted, the springs 47b and 47c are arranged as shown in FIG. 4 according to this embodiment.

Figure 6:
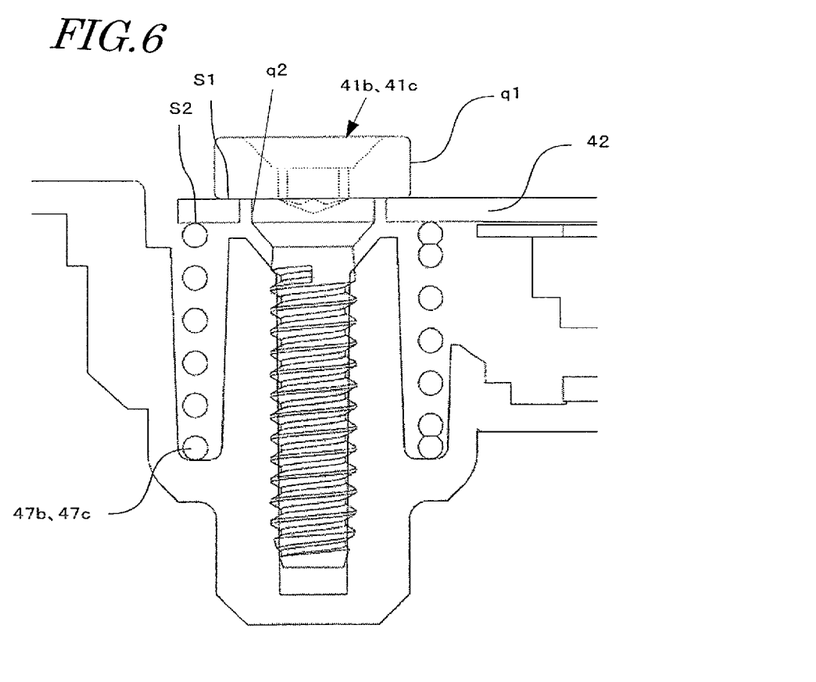
FIG. 6 is a cross-sectional view illustrating a portion of the sheet metal 42, into which a screw 41b or 41c is being screwed.

FIG. 6 is a cross-sectional view illustrating a portion of the sheet metal 42, into which the screw 41b or 41c is being screwed. The springs 47b and 47c produce elastic force opposite to the direction in which the screws 41b and 41c are screwed. As a result, the angle defined by the second portion 50b can be changed in the direction coming out of the paper on which FIG. 5 is drawn. That is why even if the bridge portions 50c and 50d were deformed elastically beyond their limit when the screwing heights of the screws 41b and 41c are adjusted, the springs 47b and 47c could make the respective flange portions of the screws 41b and 41c secure contact with those portions of the sheet metal 42 that surround the screw holes 42b and 42c.

In this embodiment, the respective axes of the springs 47b and 47c are aligned with those of the screws 41b and 41c, respectively, and the points of application S1 at which the screws 41b and 41c are screwed through the sheet metal 42 are defined close to the points of application S2 at which the springs 47b and 47c apply elastic force to the sheet metal 42. When the sheet metal 42 is viewed from over the paper on which FIG. 5 is drawn, the points of application of the screws and the points of application of the springs are at substantially the same locations near the screw holes 42b and 42c. If the point of application of a screw were distant from that of its associated spring, then the second portion 50b would be liable to deformed. That is why to lighten unnecessary load on the second portion 50b, the points of application of the screws are defined in this embodiment at substantially the same locations as those of the springs.

According to the arrangement of the embodiment described above, one of the screws 41b and 41c may be either tightened or loosened depending on whether the angle defined by the second portion 50b with respect to the master flange 48 should be adjusted along the X-axis or the Y-axis. In that case, since no trial and error would be needed, the adjustment work could get done in a much shorter time.

The master flange 48 is designed and attached to the body of the digital camera 100 so as to cross the optical axis at right angles. With the structure of the present invention, the angle defined by the second portion 50b, to which the CCD 44 is attached, can be adjusted in the X- or Y-axis direction independently of each other by tightening or loosening the screws, and therefore, the CCD 44 can be adjusted precisely so as to cross the optical axis at right angles.

In addition, by screwing only the screw 41a as tight as possible, the tilt can be adjusted in both of the X- and Y-axis directions independently of each other and with good stability. On top of that, the sheet metal also has a very simple structure.

Since the screw 41a has been screwed as tight as possible, the second portion 50b will not tilt easily even when subjected to some unexpected external force due to vibration or dropping. In particular, if the spring is arranged right under the flange portion of the screws 41b and 41c, the tilt of the second portion 50b can be maintained with more stability. On top of that, since the position can be adjusted while the bridge portions and the springs apply their forces in mutually opposite directions, the angle can be adjusted finely and the positioning precision can be increased.

The sheet metal 42 is positioned two-dimensionally (i.e., within the X-Y plane) by the outside diameter of the stepped portion q2 of each of the screws 41a and 41c, which is provided right under its flange (i.e., screw head) portion q1. Also, even when the tilt of the CCD is adjusted by the screws 41b and 41c, the sheet metal 42 can always be positioned two-dimensionally (within the X-Y plane) by the outside diameter of the stepped portion q2 of the screws 41a and 41c.

The screws 41a, 41b and 41c are usually made of either a metallic material or a material with high hardness such as a ceramic. That is why even if some friction is generated between the end face of the screw hole 42c of the sheet metal 42 and the stepped portion q2 of the screw 41c when the tilt of the CCD is adjusted or when the digital camera is subjected to some unexpected external force due to vibration or dropping, no abrasion or stick-slipping will be caused and the tilt will not vary easily unlike a situation where friction is generated between a resin and a metal, for example. On top of that, the tilt will hardly vary according to the environment or with time. And if an additional hole were cut through the sheet metal and if the sheet metal were positioned two-dimensionally with a projection on the master flange, the effect of the present invention should be understood even more clearly. Specifically, since the master flange is generally a resin member, the projection on the resin member will be fitted into the hole of the sheet metal. In that case, the resin projection might collapse while the tilt is being adjusted or would not slide smoothly inside the end face of the hole of the sheet metal, thus making it impossible to adjust the tilt with high precision. For that reason, the arrangement of the present invention can be used very effectively.

Next, the process step of assembling the CCD 44, the cushion 45 and the optical filter 46 will be described.

Figure 7:
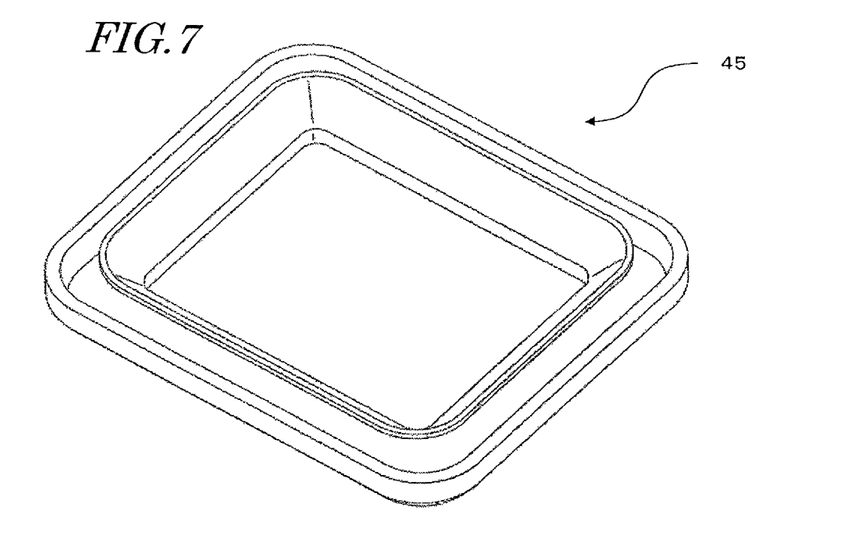
FIG. 7 is a perspective view illustrating a cushion 45.

FIG. 7 is a perspective view illustrating the cushion 45. As can be seen easily from FIG. 7, the cushion 45 is designed so that one of the two openings thereof is bigger than the other.

Figure 8:
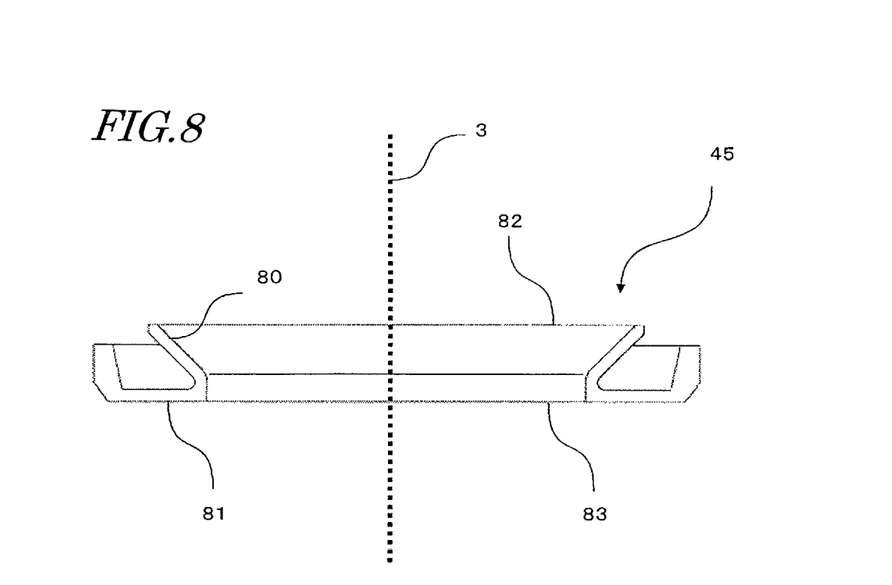
FIG. 8 is a cross-sectional view of the cushion 45 as viewed on a plane that is parallel to an assembling direction.

FIG. 8 is a cross-sectional view of the cushion 45 as viewed on a plane that is parallel to the assembling direction. The cushion 45 has a sloped portion 80, which defines a tilt angle with respect to the optical axis 3. Due to the presence of this sloped portion 80, the one opening 82 is bigger than the other opening 83. The frame 81 that surrounds the opening 83 of the cushion 45 crosses the optical axis 3 at right angles in this example.

Next, it will be described with reference to FIGS. 9 and 10 how the shape of the cushion 45 changes before and after the CCD 44 is attached to the cushion 45.

Figure 9:
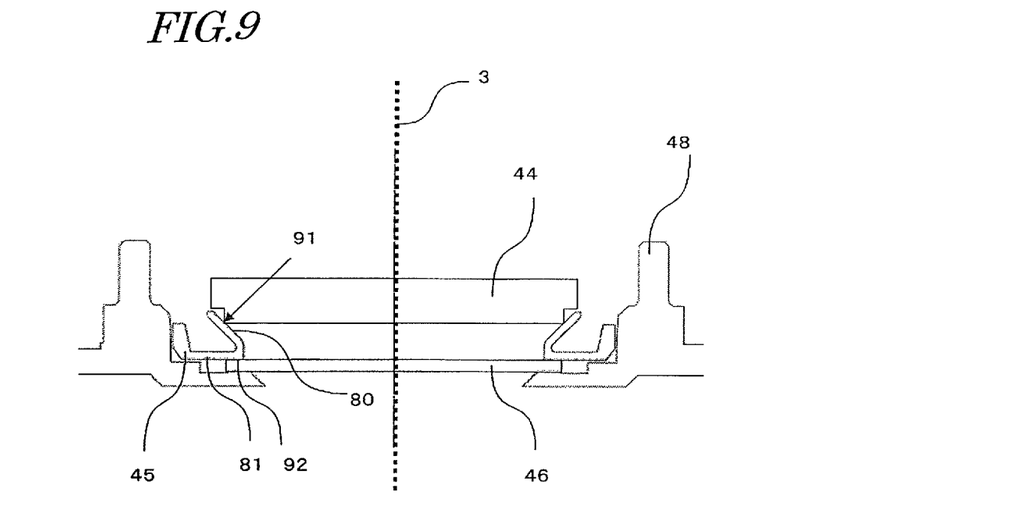
FIG. 9 illustrates the positions of respective members just before a CCD 44 is attached to the cushion 45.
Figure 10:
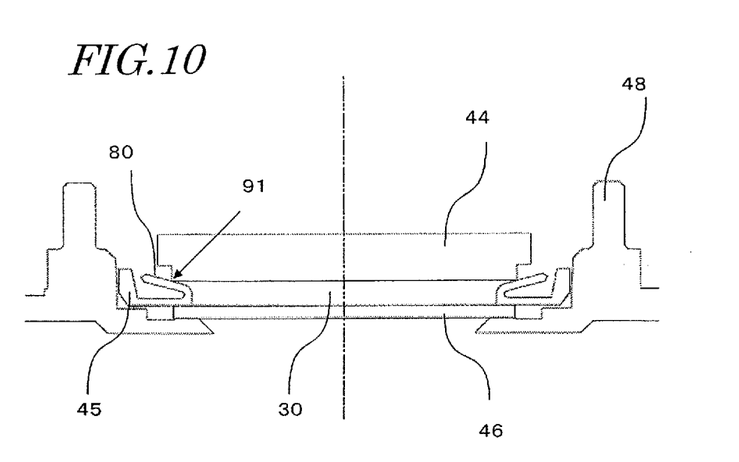
FIG. 10 illustrates the positions of the respective members right after the CCD 44 has been attached to the cushion 45.

FIGS. 9 and 10 illustrate where these members are just before the CCD 44 is attached to the cushion 45 and right after the CCD 44 has been attached to the cushion 45, respectively.

As shown in FIGS. 9 and 10, the CCD 44 contacts with the cushion 45 at the middle 91 of the sloped portion 80 of the cushion 45 and presses the cushion 45 parallel to the optical axis 3, thereby flexing the cushion 45. At this point in time, pressure and restitution force are respectively applied from the CCD 44 and from the cushion 45 to their points of contact, and no gap is left between the CCD 44 and the cushion 45 at their points of contact.

To bring the CCD 44 into contact with the cushion 45 at the middle 91 of the sloped portion 80, some edges of the CCD 44 to contact with the cushion 45 are stepped (or notched). By providing such stepped portions, the CCD 44 can be brought into contact with the sloped portion 80 at as low a point on the middle 91 as possible. However, it is not always necessary to provide such notched (or stepped) portions.

On the other hand, the frame 81 is bonded to its adjacent optical filter 46 at the points 92. Also, the outer periphery of the cushion 45 is prevented by the master flange 48 from moving or being deformed. As a result, the space 30 is entirely closed up by the CCD 44, the cushion 45 and the optical filter 46, and therefore, dust will never enter the space 30 from outside of the camera.

In the embodiment described above, the cushion 45 is supposed to be made of rubber. However, this is just an example. Alternatively, the cushion 45 may also be made of silicone, elastomer, plastic or any other suitable elastic material as well.

In the embodiment described above, the CCD 44 is supposed to contact with the cushion 45 at the middle 91 of the sloped portion 80 of the cushion 45 as shown in FIGS. 9 and 10. A person with ordinary skills in the art would normally arrange these members so that the CCD contacts with the uppermost portion of the packing (or cushion), which corresponds to the opening 82 shown in FIG. 8 of the present application, as shown in FIG. 5 of Patent Document No. 1 that has already been cited in the description of the background art. Patent Document No. 1 points out that the deformation to be caused by the flexure at the top of the packing is a problem, but there are other problems, too.

Figure 11:
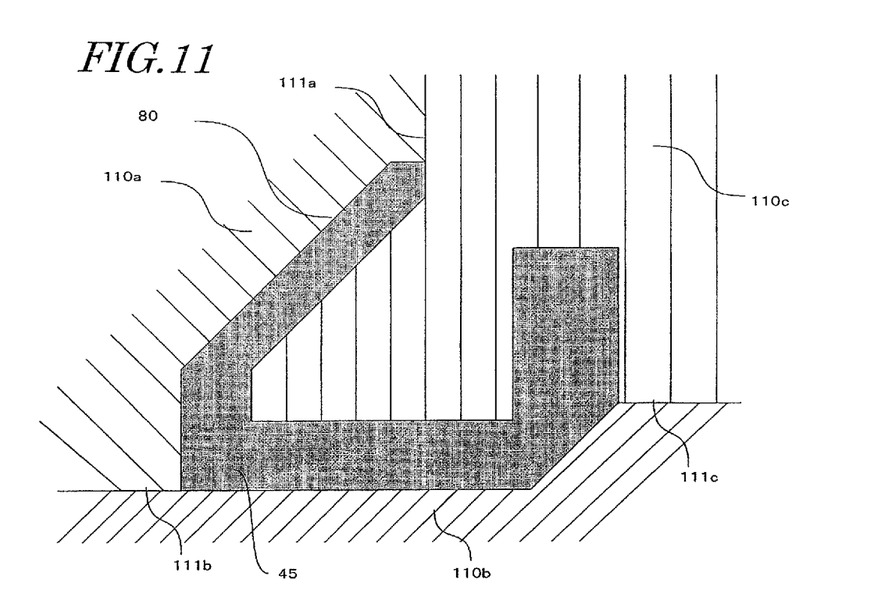
FIG. 11 illustrates the cushion 45 being formed with three molds 110a, 110b and 110c.

FIG. 11 illustrates the cushion 45 being formed with three molds 110a, 110b and 110c. By using these three molds 110a, 110b and 110c, burrs will be left on the cushion 45 at the junctions between those molds. Specifically, a burr 111a will be left at the junction between the molds 110a and 110c, a burr 111b will be left at the junction between the molds 110a and 110b, and a burr 111c will be left at the junction between the molds 110b and 110c.

The burr 111a is left at the uppermost portion of the sloped portion 80 (i.e., at the top of the opening 82 shown in FIG. 8). That is why if the CCD were brought into contact with the uppermost portion of the sloped portion 80, the burr 111a would make a gap there even without flexure at the uppermost portion, and therefore, the space 30 could not be closed up entirely.

The burr 111a could be removed to a certain degree. But to do that, an additional process step would have to be performed and extra cost and time would be required. The burr and the body are continuously made of the same material, and therefore, it is very difficult to remove the burr perfectly. That is to say, if one tried to remove the burr perfectly, the body could also be partially removed unintentionally. Also, it is almost impossible to avoid leaving any burr by arranging the junction between the molds totally in contact with what needs to be encapsulated.

On top of that, since a peripheral portion of rubber, for example, will be deformed easily with time, the space 30 cannot be closed up for a long time, no matter whether some burrs are left there or not.

For that reason, the problem to be caused if the CCD were brought into contact with the uppermost portion of the sloped portion 80 is never negligible. Patent Document No. 1 points out such a problem to encourage the designers to develop a modified arrangement, and does develop a modified arrangement by itself, too.

On the other hand, according to this embodiment, even if there is such a burr 111a, there is no need to remove it, and yet the space 30 can be closed up securely. On top of that, the cushion 45 has a simpler shape and its mold can be made more easily compared to the packing shown in FIG. 1 of Patent Document No. 1. Thus, such a cushion 45 can be either purchased at a low price or made at a low cost.

According to this embodiment, the optical element is brought into contact with the resilient member (i.e., the cushion 45) at the middle of its sloped portion, thus realizing a high degree of sealing without being affected by burrs or a variation in the shape of the element. In addition, such a high degree of sealing can be maintained even if the gap between the CCD as the optical element and the optical filter varies. On top of that, since the middle of the sloped portion is used, such a high degree of sealing can also be maintained even when the tilt angle of the CCD is adjusted. Furthermore, even if the resilient member were compressed or deformed while the camera is being used, that high degree of sealing will not be affected, either.

By performing the assembling and adjusting process steps described above, in the digital camera 100 of this embodiment, the CCD 44 is adjusted so as to cross the optical axis of the optical system of the digital camera 100 at right angles and the space 30 between the CCD 44 and the optical filter 46 can be closed up with the cushion 45.

In the foregoing description, the sheet metal 42 is supposed to have the shape shown in FIG. 5. However, this is just an example and any other shape may also be used.

Figure 12:
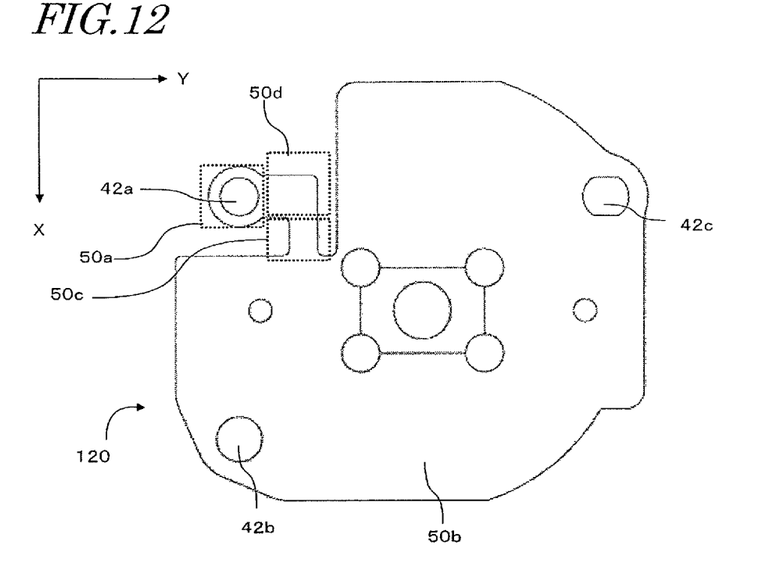
FIG. 12 illustrates a sheet metal 120 in a different shape.

FIG. 12 illustrates a sheet metal 120 in a different shape. In FIG. 12, any member having substantially the same function or configuration as the counterpart of the sheet metal 42 shown in FIG. 5 is identified by the same reference numeral.

The sheet metal 120 also consists of a first portion 50a, a second portion 50b and two bridge portions 50c and 50d. In the sheet metal 120, the bridge portions 50c and 50d are integrated together unlike the sheet metal 42.

However, just like the sheet metal 42, the bridge portion 50c is arranged so as to run parallel to the line that connects together the fixing screw hole 42a and the adjusting screw hole 42b (i.e., the X-axis direction in FIG. 5) and the bridge portion 50d is arranged so as to run parallel to the line that connects together the fixing screw hole 42a and the adjusting screw hole 42c (i.e., the Y-axis direction in FIG. 5). As the bridge portions 50c and 50d are elastically deformed in the same direction as the sheet metal 42, the person who makes adjustment can see intuitively which of the two screws 41b and 41c needs to be tightened or loosened.

Next, an alternative arrangement that needs no springs 47b, 47c (see FIGS. 4 and 6) will be described with reference to FIGS. 13 through 15.

Figure 13:
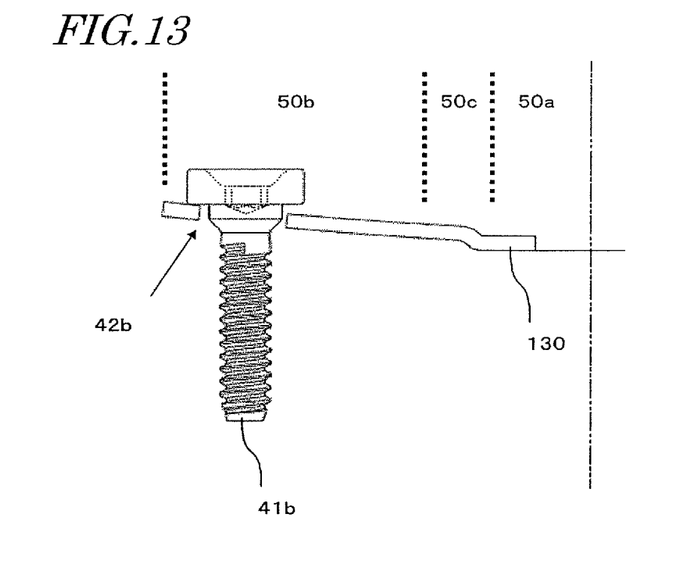
FIG. 13 is a partial cross-sectional view of a sheet metal 130 in another exemplary arrangement.

FIG. 13 is a partial cross-sectional view of a sheet metal 130 in another exemplary arrangement according to this embodiment. This sheet metal 130 also has bridge portions, only one (50c) of which is shown in FIG. 13.

In the sheet metal 42, the first and second portions 50a and 50b and the bridge portions 50c and 50d are all supposed to be arranged on the same plane.

In this sheet metal 130, on the other hand, at least one of the bridge portions 50c and 50d has been warped in advance, and therefore, the first and second portions 50a and 50b and the bridge portions 50c and 50d are not arranged on the same plane. In the following example, the bridge portion 50c is supposed to be warped in advance.

FIG. 13 illustrates a cross-sectional shape of the sheet metal 130 at a point in time when the screw hole 42b has not been fastened with the screw 41b yet.

In this case, the bridge portion 50c has been warped opposite to the direction in which the screw 41b needs to be tightened. If the bridge portion 50c has been warped in advance, the bridge portion 50c will apply elastic force in the opposite direction when the screw 41b is tightened. The elastic force of the bridge portion 50c is comparable to the elastic force applied by the spring 47b. That is why there is no need to provide the spring 47b anymore.

Figure 14:
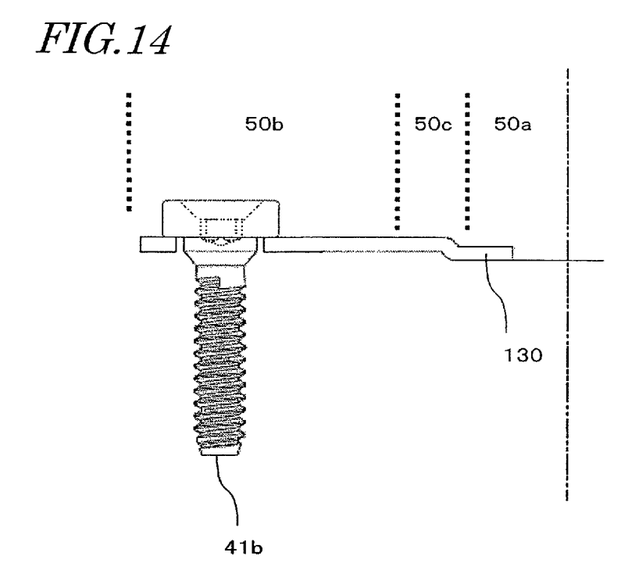
FIG. 14 illustrates a cross-sectional shape of the sheet metal 130 at a point in time when the screw 41b has been tightened to the point that the first and second portions 50a and 50b and the bridge portion 50c are substantially level with each other.

FIG. 14 illustrates a cross-sectional shape of the sheet metal 130 at a point in time when the screw 41b has been tightened to the point that the first and second portions 50a and 50b and the bridge portion 50c are substantially level with each other. Even in such a state, the bridge portion 50c still applies elastic force opposite to the direction in which the screw 41b is screwed.

Figure 15:
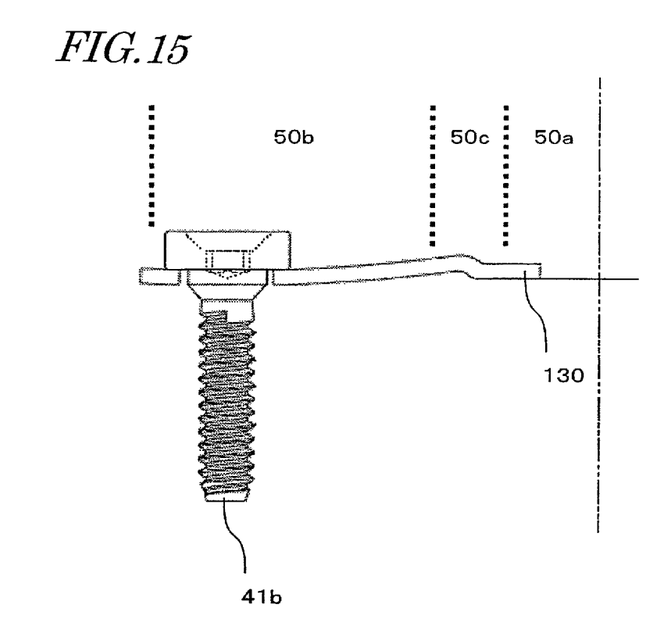
FIG. 15 illustrates a cross-sectional shape of the sheet metal 130 at a point in time when the screw 41b has been screwed even tighter than in FIG. 14.

And FIG. 15 illustrates a cross-sectional shape of the sheet metal 130 at a point in time when the screw 41b has been screwed even tighter than in FIG. 14. At this point in time, the bridge portion 50c applies greater elastic force than in FIG. 14 opposite to the direction in which the screw 41b is screwed.

Since the sheet metal 42 is designed so that the bridge portions would have elastic force, it is easy, and would hardly increase the manufacturing cost, to warp the bridge portions in advance opposite to the direction in which the screw 41b is screwed. In this case, since no springs are needed, the cost could rather be reduced.

In the example illustrated in FIG. 8, the sloped portion 80 is supposed to be provided for only the opening to receive the CCD 44. However, this is just an example. Alternatively, the sloped portion 80 may be provided for only the opening to receive the optical filter 46. In that case, the frame to receive the CCD 44 will be formed to cross the optical axis 3 at right angles. Still alternatively, sloped portions could be provided on both of the CCD (44) and optical filter (46) sides. Optionally, the optical filter 46 could be replaced with a transparent plate that is transparent to visible radiation.

INDUSTRIAL APPLICABILITY

The present invention is applicable for use in the process step of assembling an optical system for a digital camera with an imager and in the process step of positioning the imager with respect to the optical axis, and can be used effectively to produce a subject's image on the imager as accurately as possible.

REFERENCE SIGNS LIST 42 sheet metal
43 flexible printed circuit board
44 CCD
45 cushion
46 optical filter
47b, 47c spring
48 master flange
50a first portion of the sheet metal 42
50b second portion of the sheet metal 42
50c, 50d bridge portion
80 sloped portion of the cushion 45
81 frame of the cushion 45
82 wider opening of the cushion 45
83 narrower opening of the cushion 45
91 middle of the sloped portion 80

The invention claimed is:
1. An imaging device comprising:
an imager;
a plate member, to which the imager is attached; and
a holding member configured to hold the plate member,
wherein the plate member has
a first portion, through which at least one fixing hole has been cut, and
a second portion, to which the imager is attached and through which at least one adjusting hole has been cut,
wherein the plate member is held by the holding member using a number of fastening members to be introduced through the at least one fixing hole and the at least one adjusting hole,
when the first portion is fixed on the holding member, the fastening member that is introduced through the at least one adjusting hole adjusts the relative position of the second portion to the holding member,
the plate member and the holding member are stacked one upon the other in a direction that is substantially parallel to a direction in which an optical axis extends, and
an angle defined by the second portion with respect to the holding member is adjusted so that the imager attached to the second portion crosses the optical axis at right angles,
further comprising at least one bridge portion that connects the first and second portions together,
wherein the at least one bridge portion is elastically deformable,
when the first portion is fixed on the holding member, the at least one bridge portion being elastically deformed adjusts a relative position of the second portion to the holding member,
the at least one fixing hole is a single fixing hole, and
the at least one adjusting hole includes first and second adjusting holes, and wherein the at least one bridge portion includes:

a first bridge portion, which runs substantially parallel to a line that connects together the fixing hole and the first adjusting hole; and a second bridge portion, which runs substantially parallel to a line that connect together the fixing hole and the second adjusting hole and which runs to cross the first bridge portion at substantially right angles.

2. The imaging device of claim 1, wherein the plate member is elastically deformable, and wherein when the first portion is fixed on the holding member, the plate member being elastically deformed adjusts the relative position of the second portion to the holding member.

3. The imaging device of claim 2, wherein each of the fastening members is a screw, and wherein the first adjusting hole is an elongated hole, a longer diameter of which is greater than a diameter of the screws and is parallel to the first bridge portion, and wherein the second adjusting hole is a round hole, a diameter of which is greater than that of the screws.

4. The imaging device of claim 3, further comprising at least one elastic body, which is arranged between the second portion of the plate member and the holding member, wherein the screws that are the fastening members apply a force to the second portion toward the holding member and the at least one elastic body biases the second portion away from the holding member, thereby maintaining the adjusted relative position of the second portion to the holding member.

5. The imaging device of claim 4, wherein a point of application of the at least one elastic body is defined so that forces are applied by the screws and the at least one elastic body to substantially the same point on the second portion.

6. The imaging device of claim 3, wherein the at least one bridge portion is warped so as to be biased away from the holding member, and wherein the screws that are the fastening members apply a force to the second portion toward the holding member and the at least one bridge portion warped biases the second portion away from the holding member, thereby maintaining the adjusted relative position of the second portion to the holding member.

7. An imager unit comprising:

an imager;

a plate member, to which the imager is attached; and a holding member configured to hold the plate member, wherein the plate member has a first portion, through which at least one fixing hole has been cut, and a second portion, to which the imager is attached and through which at least one adjusting hole has been cut, wherein the plate member is held by the holding member using a number of fastening members to be introduced through the at least one fixing hole and the at least one adjusting hole, when the first portion is fixed on the holding member, the fastening member that is introduced through the at least one adjusting hole adjusts the relative position of the second portion to the holding member, the plate member and the holding member are stacked one upon the other in a direction that is substantially parallel to a direction in which an optical axis extends, and an angle defined by the second portion with respect to the holding member is adjusted so that the imager attached to the second portion crosses the optical axis at right angles, further comprising at least one bridge portion that connects the first and second portions together, wherein the at least one bridge portion is elastically deformable, when the first portion is fixed on the holding member, the at least one bridge portion being elastically deformed adjusts a relative position of the second portion to the holding member, the at least one fixing hole is a single fixing hole, and the at least one adjusting hole includes first and second adjusting holes, and wherein the at least one bridge portion includes:

a first bridge portion, which runs substantially parallel to a line that connects together the fixing hole and the first adjusting hole; and a second bridge portion, which runs substantially parallel to a line that connect together the fixing hole and the second adjusting hole and which runs to cross the first bridge portion at substantially right angles.

* * * * *